United States Patent [19]

Masaki

[11] Patent Number: 5,379,175
[45] Date of Patent: Jan. 3, 1995

[54] INTEGRATED CIRCUIT DEVICE HAVING HIGH ABNORMAL VOLTAGE DETECTION CIRCUIT

[75] Inventor: Satoru Masaki, Kawasaki, Japan

[73] Assignee: Fujitsu Limited, Kawasaki, Japan

[21] Appl. No.: 883,456

[22] Filed: May 15, 1992

[30] Foreign Application Priority Data

May 17, 1991 [JP] Japan ............................ 3-113160

[51] Int. Cl.⁶ ........................ H02H 3/20; H02H 9/00
[52] U.S. Cl. ............................................ 361/56; 361/91
[58] Field of Search ................ 361/56, 58, 86, 88, 361/91, 111; 257/355, 356, 357, 358, 173, 372, 373

[56] References Cited

U.S. PATENT DOCUMENTS

| | | | |
|---|---|---|---|
| 4,520,418 | 5/1985 | Susi | 361/92 |
| 4,551,841 | 11/1985 | Fujita et al. | 371/66 |
| 4,835,649 | 5/1989 | Salerno | 361/18 |

*Primary Examiner*—Jeffrey A. Gaffin
*Assistant Examiner*—Ronald W. Leja
*Attorney, Agent, or Firm*—Nikaido, Marmelstein, Murray & Oram

[57] ABSTRACT

A semiconductor integrated circuit device includes an internal logic circuit which is reset in response to a reset signal, and an abnormal voltage detection circuit, operatively connected to said internal logic circuit and an external terminal, for generating the reset signal when an abnormal voltage is detected at the external terminal.

15 Claims, 6 Drawing Sheets

FIG.1

(PRIOR ART)

INTEGRATED CIRCUIT DEVICE HAVING HIGH ABNORMAL VOLTAGE DETECTION CIRCUIT

BACKGROUND OF THE INVENTION

1. Field of the Invention

The present invention generally relates to semiconductor integrated circuit devices such as microcomputers, and more particularly to a semiconductor integrated circuit device having a means for preventing the microcomputers or the like from malfunctioning in response to the application of an abnormal voltage.

2. Description of the Related Art

Recently, a large number of various IC devices have become available. A one-chip microcomputer has been widely used for controlling devices. Many of the one-chip microcomputers use CMOS transistors (Complementary Metal Oxide Semiconductor transistors). Such one-chip microcomputers are expected to be used in various circumstances. For example, the one-chip microcomputers are used in circumstances in which excessively low or high voltages are applied to input/output terminals thereof. Such abnormal voltages cause a latchup inherent in CMOS transistor circuits. The latchup may destroy insulation of internal circuits or may cause the microcomputer to run away. In these cases, it becomes no longer possible to maintain the circuit operation in the normal state. With the above in mind, protection circuits are provided for input/output circuits of the integrated circuits. The protection circuits function to protect the input/output circuits from the abnormal voltages. When an abnormal voltage is supplied to an input/output terminal, the protection circuit coupled to the input/output terminal causes a charge resulting from the abnormal voltage to flow to the ground.

Figure 1:
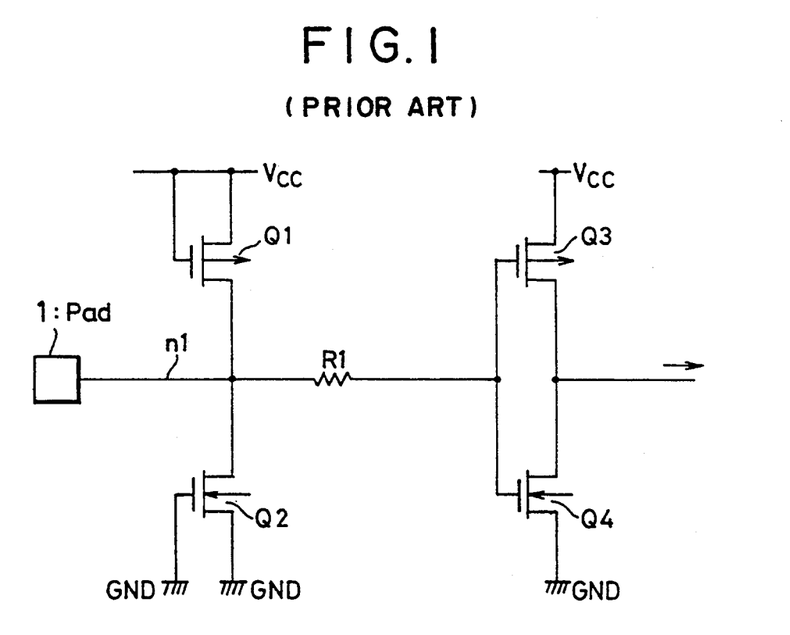
FIG. 1 is a circuit diagram of a related input circuit with a protection circuit added thereto.

FIG. 1 is a circuit diagram of a related input interface circuit of an integrated circuit, such as a one-chip microcomputer. An input node n1 connected to a pad 1 functioning as an external terminal is connected to drains of P-channel and N-channel protection transistors Q1 and Q2, both of which form a protection circuit. The drains of the protection transistors Q1 and Q2 are coupled, through a parasitic resistor R1, to gates of transistors Q3 and Q4, both of which form a CMOS inverter in the input interface circuit.

The gate and source of the protection transistor Q1 are connected to a high-potential power supply system $V_{CC}$. The gate and the source of the protection transistor Q2 are connected to a low-voltage power supply system GND. A positive charge resulting from an abnormal voltage higher than the power supply voltage $V_{CC}$ flows to the high-potential power supply system $V_{CC}$ through the protection transistor Q1. A negative charge resulting from an abnormal voltage lower than the power supply voltage GND flows to the lower-potential power supply system GND through the protection transistor Q2. During the above operation, the parasitic resistor R1 functions to prevent the abnormal voltage from being directly applied to the gates of the input buffer transistors Q3 and Q4.

Figure 2:
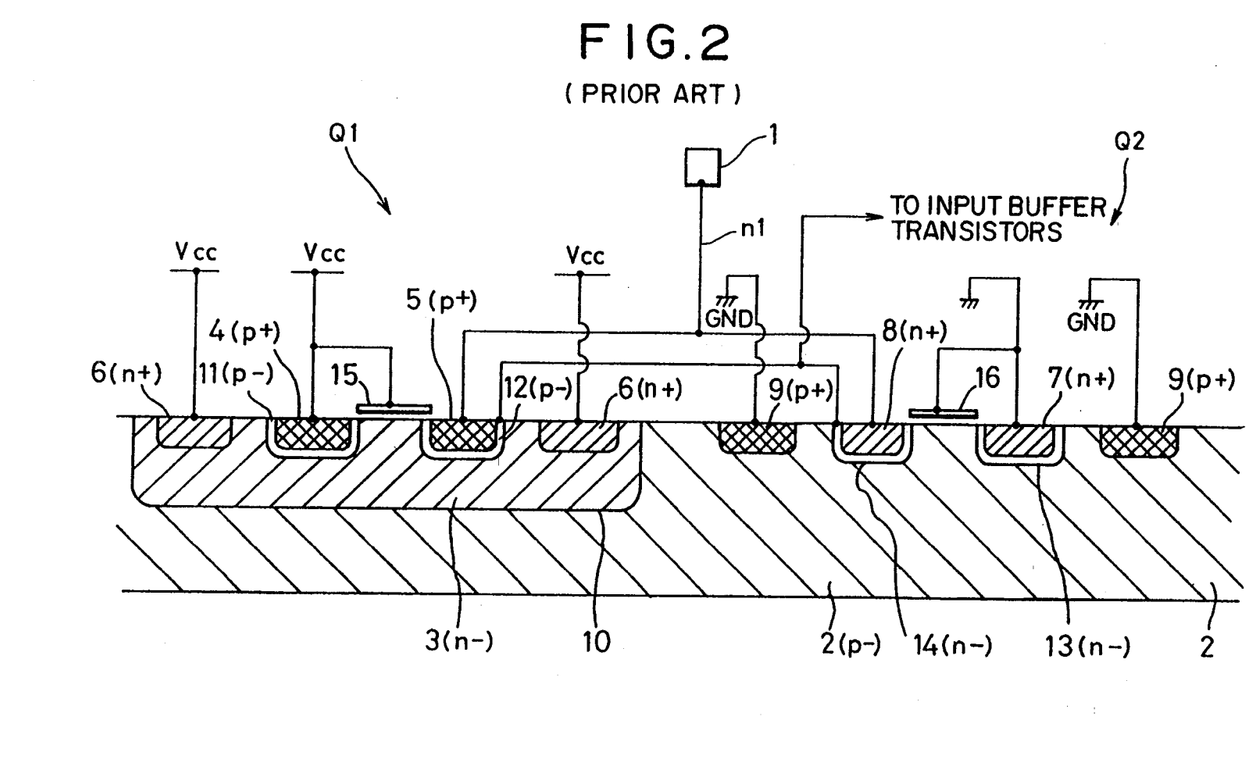
FIG. 2 is a cross-sectional view of a semiconductor integrated circuit device which realizes the circuit shown in FIG. 1.

FIG. 2 is a cross-sectional view of a semiconductor integrated-circuit device that provides the circuit shown in FIG. 1. The P-channel and N-channel transistors Q1 and Q2 are formed in an upper surface portion of a p-type semiconductor substrate 2 so that these transistors are close to each other. Two p-type regions 11 and 12 are formed in an n-type well 3 forming the P-channel protection transistor Q1. Two p+-type regions for forming a source 4 and a drain 5 are formed in the p-type regions 11 and 12, respectively. The source 4 and a gate 15 are connected to the high-potential power supply system $V_{CC}$, and the drain 5 is connected to the pad 1. The p-type region 12 surrounding the drain 5 is connected to the input buffer transistors of the internal circuit. An n−-type region 6, which is called a stopper, is formed around the n-type well region 3 so that the source 4 and the drain 5 are formed in the n+-type well region 3. The n+-type region 6 is connected to the high-potential power supply system $V_{CC}$ at a plurality of points.

A source 7 and a drain 8 of the N-channel protection transistor Q2 are formed in n-type regions 13 and 14, respectively. The source 7 and a gate 16 are connected to the low-potential power supply system GND, and the drain 8 is connected to the pad 1. The n-type region 14 is connected, together with the p-type region 12 of the P-channel protection transistor Q1, to the input buffer transistors. A p+-type region 9 functioning as a stopper is formed so that the source 7 and the drain 8 are formed in the p+-type region 9, which are connected to the low-potential power supply system GND at a plurality of points. The p+-type region 9 and the n+-type region 6 that is connected to the high-potential power supply system $V_{CC}$ maintain the substrate potential at a predetermined potential, and apply a backward voltage to a diode junction interface which isolates the regions of the protection transistors Q1 and Q2 from each other.

It is known that a parasitic bipolar transistor is formed in an area in which the protection transistors Q1 and Q2 are formed. The n+-type region on the side of the P-channel transistor Q1 serves as a base of a PNP parasitic transistor, which has an emitter formed by the drain of the P-channel transistor Q1, and a collector formed by the p+-type region 9 on the side of the N-channel transistor Q2. Similarly, the p+-type region 9 on the side of the N-channel transistor Q2 serves as a base of an NPN parasitic transistor, which has an emitter formed by the drain 8 of the N-channel transistor Q2 and a collector formed by the n+-type region 6.

Figure 3:
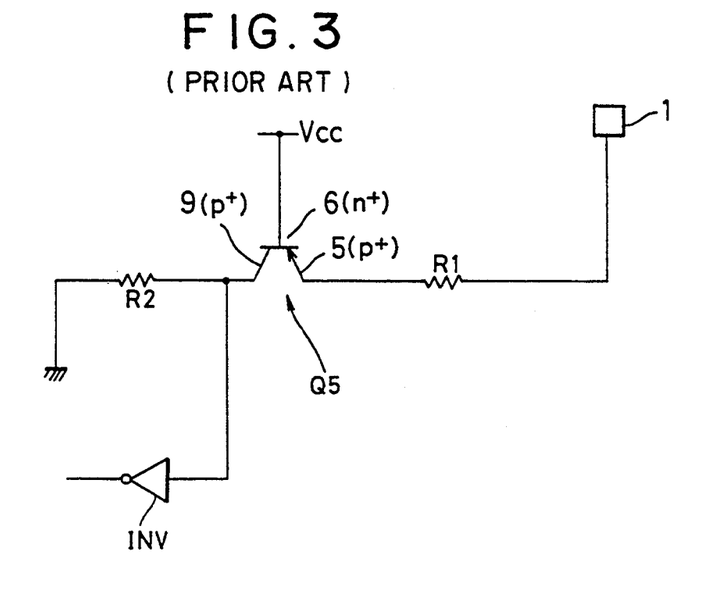
FIG. 3 is a circuit diagram of a voltage detection circuit.

FIG. 3 is a circuit diagram of a circuit including a PNP bipolar transistor used as a voltage detection circuit. When a voltage higher than the voltage $V_{CC}$ is applied to the pad 1, the bipolar transistor Q5 conducts, and a voltage developed across an output resistor R2 is output via an inverter INV. The transistor Q5 conducts when the base-emitter voltage thereof becomes equal to or higher than 0.6 V, for example, and activates the inverter INV. The output resistor R2 has a resistance value equal to or larger than, for example, 40 kΩ. For example, a polysilicon sheet is used for forming the output resistor R2.

It will be noted that either the protection transistor Q1 or the protection transistor Q2 respond to an abnormal voltage applied to the pad 1 so that the internal circuit can be protected from the abnormal voltage. Hence, even if the abnormal voltage is continuously applied to the pad, a charge resulting from the abnormal voltage continuously flows in the protection transistor Q1 or Q2 unless the power supply systems are fused. As a result, the internal circuit will continuously operate normally.

However, if an excessive current passes through the LSI devices, the latchup inherent in the CMOS circuits may take place in the internal circuit or an abnormal voltage may be directly applied to the internal circuit from the substrate. Hence, the operation of the internal circuit will be affected. Particularly, the microcomputer may be caused to run away. If the microcomputer is designed to control a vehicle, it is specifically required that the latchup or other unwanted events be suppressed.

In order to avoid the influence of the latchup or other unwanted events, it is possible to provide noise eliminating circuits connected to terminals of the LSI chips or control the LSI chips by means of software. However, these methods increase the production costs as a whole.

SUMMARY OF THE INVENTION

It is a general object of the present invention to provide a semiconductor integrated circuit device in which the above disadvantages are eliminated.

A more specific object of the present invention is to provide a semiconductor interface circuit device having an abnormal voltage detection circuit capable of effectively detecting an abnormal voltage and preventing internal circuits from malfunctioning.

The above objects of the present invention are achieved by an integrated circuit device comprising: an internal logic circuit which is reset in response to a reset signal; and abnormal voltage detection means, operatively connected to the internal logic circuit and an external terminal, for generating the reset signal when an abnormal voltage is detected at the external terminal.

The above-mentioned objects of the present invention are also achieved by an integrated circuit device comprising: a plurality of interface circuits located in peripheral areas of a chip; internal circuits located inside the interface circuits and coupled to the interface circuits; and reset means, coupled to the interface circuits and the internal circuits, for executing a predetermined reset operation of the integrated circuit device in response to receipt of a reset signal. The internal interface circuits each comprise: a pad; protection means, coupled to the pad and the internal circuit, for preventing an abnormal voltage having a first polarity from passing through the internal circuits; abnormal voltage detection means, coupled to the pad and the protection means, for detecting an abnormal voltage having a second polarity opposite the first polarity and for generating a detection signal when the abnormal voltage having the second polarity is detected. The integrated circuit device comprises logic means for generating the reset signal from detection signals from the abnormal voltage detection means of the internal interface circuits.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 4:
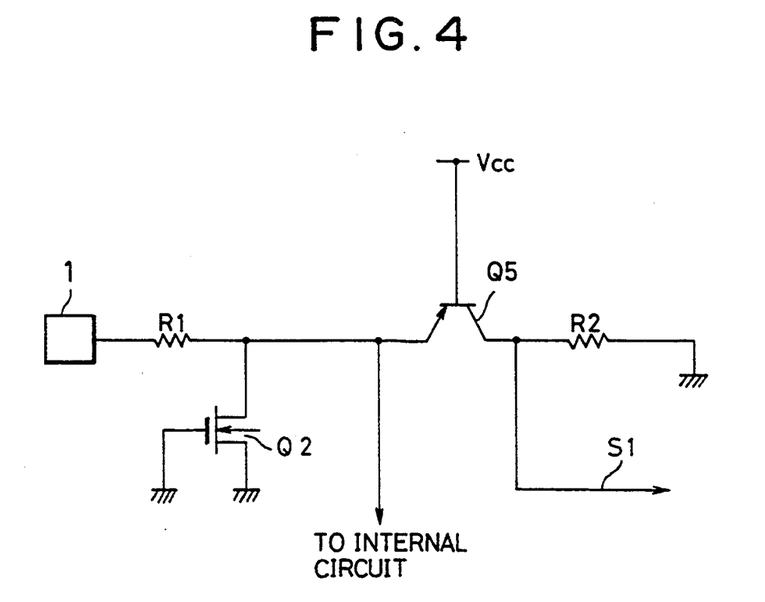
FIG. 4 is a circuit diagram of a first embodiment of the present invention.

FIG. 4 is a circuit diagram of a first embodiment of the present invention. In FIG. 4, those parts which are the same as those shown in the previous figures are given the same reference numerals. An interface circuit shown in FIG. 4 comprises the PNP transistor Q5, the N-channel MOS protection transistor Q2, the pad 1, the parasitic resistor R1 and the output resistor R2. The pad 1 is connected to the drain of the protection transistor Q2 through the resistor R1. The gate and source of the protection transistor Q2 are grounded. The pad 1 is also connected to the emitter of the bipolar transistor Q5 via the parasitic resistor R1. The base of the transistor Q5 is connected to the high-potential power supply system $V_{CC}$, and the collector thereof is grounded via the output resistor R2. The emitter of the transistor Q5 is connected to an internal circuit (not shown), and a reset signal S1 is generated at the collector of the transistor Q5. The reset signal S1 is used for, for example, resetting the entire internal circuit to thereby initialize it.

The transistor Q5 functions to detect an abnormal voltage applied to the pad 1 and much higher than the supply voltage $V_{CC}$ equal to 5 V for example, and generates the reset signal S1 when such an abnormal voltage is detected. It should be noted that the transistor Q5 shown in FIG. 3 is not used for detecting an abnormal voltage applied to the pad 1 and generating a reset signal S1. The N-channel MOS transistor Q2 flows a negative charge resulting in a negative abnormal voltage lower than the ground potential.

The internal circuit connected to the emitter of the transistor Q5 is allowed to receive, for example, a maximum of 12 V in a normal state. In this case, the current transfer ratio $h_{fe}$ of the transistor Q5 is adjusted so that the transistor Q5 is turned ON and generates the reset signal S1 when a voltage higher than 12 V is applied to the emitter thereof. The current transfer ratio $h_{fe}$ can be changed by adjusting the size of the transistor Q5.

It should be noted that the protection transistor Q1 shown in FIG. 1 is not used in the embodiment of the present invention shown in FIG. 4. This is because if the protection transistor Q1 is provided in the same manner as shown in FIG. 1, the voltage applied to the emitter of the bipolar transistor Q5 will be clamped at a voltage approximately equal to the sum of $V_{CC}$ and the base-emitter voltage of the transistor Q5 (for example, approximately 5.7 V).

Figure 5:
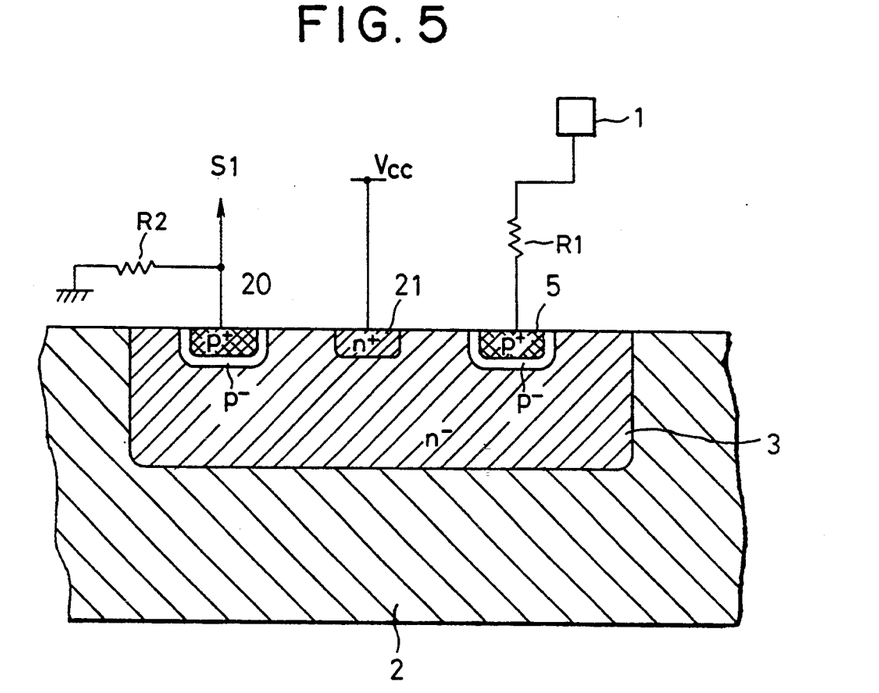
FIG. 5 is a cross-sectional view of a bipolar transistor shown in FIG. 4.

FIG. 5 is a cross-sectional view of the bipolar transistor Q5 functioning as the abnormal voltage detection circuit. A $p^+$-type region 20 serving as the collector of the transistor Q5 and an $n^+$-type region 21 serving as the base thereof are formed in the n-type area 3. The $p^+$-type region 20 is connected to the low-potential power supply system GND via the polysilicon resistor R2, and serves as a terminal at which the reset signal S1 is output. The emitter 5 of the transistor Q5 is connected to the pad 1 via the polysilicon resistor 1. The $n^+$-type region 21 is connected to the high-voltage power supply system $V_{CC}$.

It should be noted that the transistor Q5 which is a parasitic transistor having semiconductor layers of the protection transistor is intentionally used to detect an abnormal voltage. The structure of the transistor Q5 is not limited to the structure shown in FIG. 5, and another layer structure can be employed.

Figure 6:
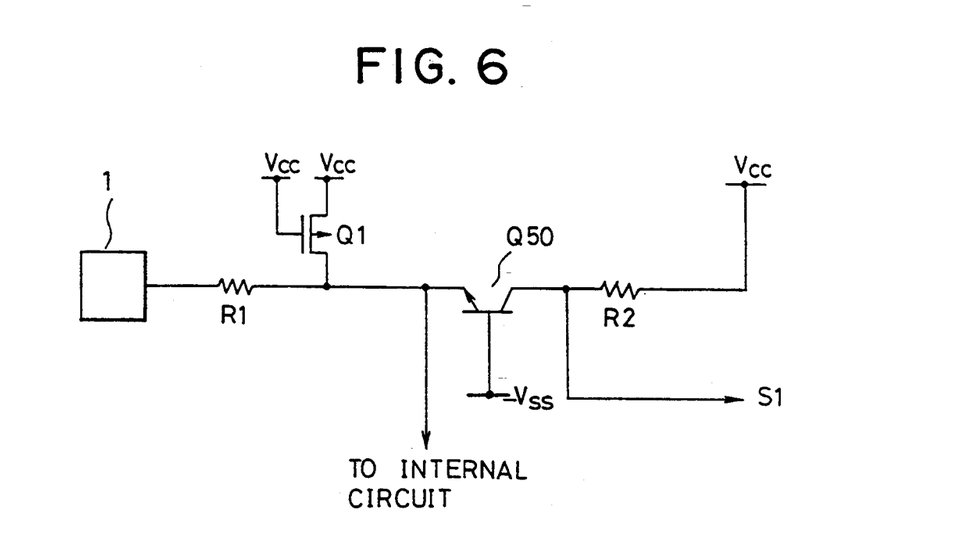
FIG. 6 is a circuit diagram of a second embodiment of the present invention.

FIG. 6 is a circuit diagram of a second embodiment of the present invention. The interface circuit shown in FIG. 6 comprises the pad 1, the P-channel MOS transistor Q1, an NPN transistor Q50, and two polysilicon resistors R1 and R2. The transistor Q50 functions as an abnormal voltage detection circuit which detects a negative abnormal voltage lower than the ground potential. The reset signal S1 is generated at the collector of the transistor Q50, which is connected to the high-potential power supply system $V_{CC}$ via the resistor R2. When the voltage applied to the emitter of the transistor Q50 becomes equal to or lower than a predetermined negative potential -Vss, the transistor Q50 is turned ON and thus the reset signal S1 is generated. The emitter of the transistor Q50 is connected to an internal circuit (not shown). In the transistor Q1, a charge flows resulting from an abnormal voltage higher than the voltage $V_{CC}$.

Figure 7:
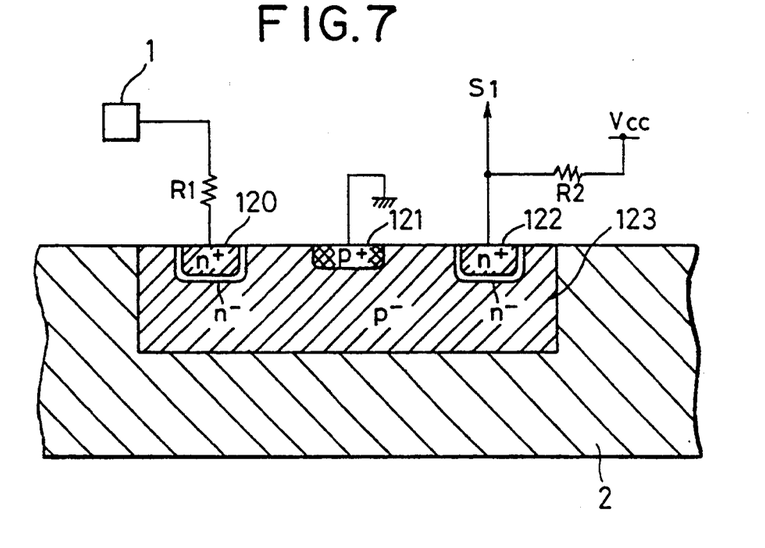
FIG. 7 is a cross-sectional view of a bipolar transistor shown in FIG. 6.

FIG. 7 is a cross-sectional view of the transistor Q50. As shown in FIG. 7, two n+-type areas 120 and 122, and a p+-type area 121 are formed in a p−-type well 123 formed in the substrate 2. The n+-type area 120 serving as the emitter of the transistor 50 is connected to the pad 1 via the resistor R1, and the n+-type area 122 serving as the drain thereof is connected to the high-potential power supply system $V_{CC}$ via the resistor R2. The p+-type area 121 serving as the base of the transistor Q50 is grounded.

Figure 8:
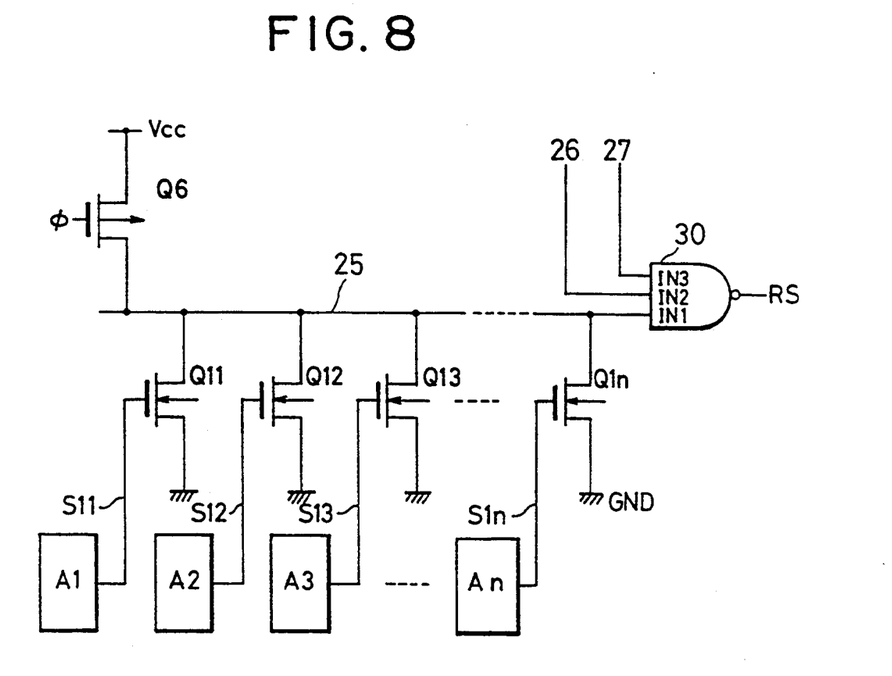
FIG. 8 is a circuit diagram of a reset signal generator.

FIG. 8 is a circuit diagram of a reset signal generator, which comprises a plurality of interface circuits respectively provided for a plurality of input and/or output circuits. The reset signal generator shown in FIG. 8 is suitable for, for example, a one-chip microcomputer installed in an automobile vehicle. In FIG. 8, a plurality of interface circuits A1-An (where n is an integer) respectively including abnormal voltage detection circuits are respectively provided for input and/or output circuits (not shown). Each of the interface circuits A1-An has the same structure as the interface circuit shown in FIG. 4. Reset signals S11-S1n respectively generated by the interface circuits A1-An are applied to gates of N-channel MOS transistors Q11-Q1n. The drains of the transistors Q11-Q1n are connected to each other via a reset bus line 25, and the sources thereof are grounded. A P-channel MOS transistor Q6 is provided so that the drain thereof is connected to the drains of the N-channel MOS transistors Q11-Q1n, and the source thereof is connected to the high-potential power supply system $V_{CC}$.

A clock signal $\phi$, which is generated by a clock generator provided in the microcomputer or an external circuit, is applied to the gate of the transistor Q6. In response to the clock signal $\phi$, the transistor Q6 is periodically turned ON, and hence the voltage $V_{CC}$ is periodically applied to the reset bus line 25. In this manner, the reset bus line 25 is periodically precharged to a voltage approximately equal to the voltage $V_{CC}$. If one of the transistors Q11-Q1n receives the reset signal maintained at a high level during the above period, the corresponding transistor is ON and hence a charge stored in the reset bus line 25 is allowed to pass through the above transistor. In this manner, the reset signal bus 25 is discharged and becomes equal to the ground potential.

Reset bus lines 26 and 27 are connected in the same manner as the reset bus line 25. A plurality of interface circuits each configured as shown in FIG. 6 are connected to the reset bus line 26. That is, when a negative abnormal voltage is detected, the reset bus line 26 is set to the ground potential. The reset bus line 27 are controlled by software in the same manner as in the case of the prior art. When an abnormality is detected by means of software, the reset bus line 27 is set to the ground potential.

The reset bus lines 25, 26 and 27 are connected to input terminals IN1, IN2 and IN3 of a NAND gate 30, respectively. When one of the reset bus lines 25-27 is set to the ground potential, a high-level reset signal RS is generated by the NAND gate 30. In response to the reset signal RS, the microcomputer is reset and initialized. When the abnormal voltage is interrupted, the microcomputer starts to operate and executes predetermined operations.

Figure 9:
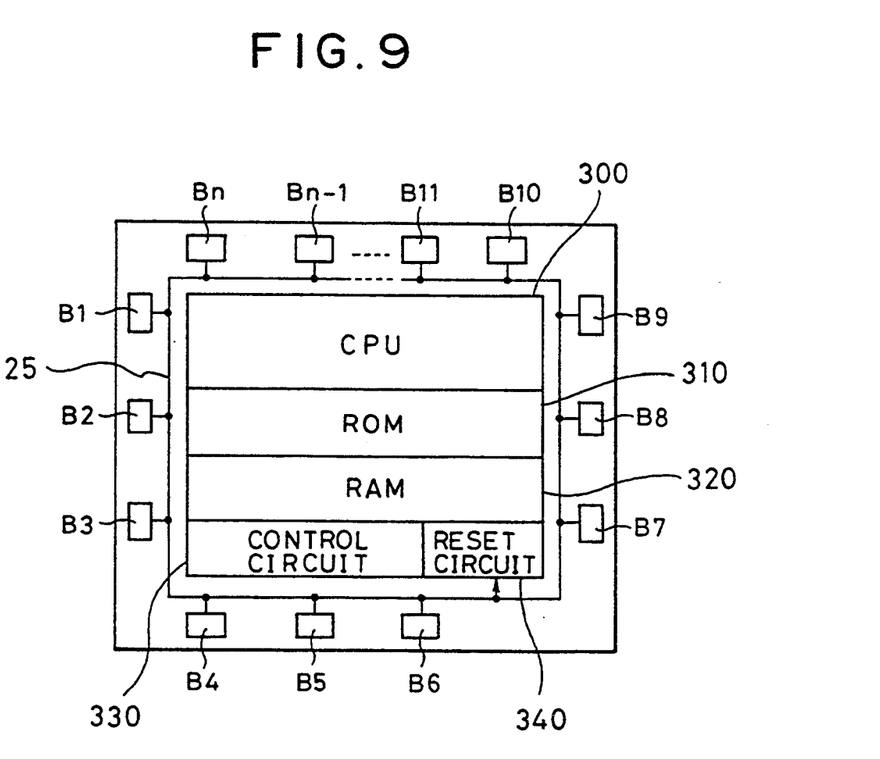
FIG. 9 is a block diagram of a one-chip microcomputer using the present invention.

FIG. 9 is a block diagram of a one-chip microcomputer having the reset signal generator shown in FIG. 8. The one-chip microcomputer shown in FIG. 9 comprises a CPU 300, a ROM 310, a RAM 320, a control circuit 330, a reset circuit 340, and input/output circuits B1-Bn (input circuits, output circuits or input/output circuits). The input/output circuits B1-Bn, which are arranged on peripheral portions of a semiconductor chip, include N-channel transistors Q11-Q1n and the interface circuits A1-An, respectively. The reset bus line 25 is provided so that it surrounds the CPU 300, the ROM 310, the RAM 320, the control circuit 330 and the reset circuit 340. The reset circuit 340, which includes the NAND gate 30 shown in FIG. 8, is connected to the reset bus line 25. When the reset bus line 25 is set to the ground level, the reset circuit 340 executes a resetting operation, and the microcomputer is initialized. For example, a program counter provided in the control circuit 330 is reset to zero. It will be noted that the resetting operation responsive to the reset signal is conventional art and a detailed description thereof will be omitted here.

In some cases, it will not be necessary to provide all input/output circuits with the interface circuits of the present invention. Some input/output circuit do not need the detection of abnormal voltages.

The present invention is not limited to the specifically disclosed embodiments, and variations and modifications may be made without departing from the scope of the present invention.

What is claimed is:

1. An integrated circuit device comprising:
a plurality of interface circuits located in peripheral areas of a chip;
internal circuits located inside the interface circuits and coupled to the interface circuits;
reset means, coupled to the interface circuits and said internal circuits, for executing a predetermined reset operation of the integrated circuit device in response to receipt of a reset signal;
each of said plurality of interface circuits including a pad,
protection means, coupled to said pad and the internal circuit, for preventing an abnormal voltage having a first polarity from passing through the internal circuits, and abnormal voltage detection means, coupled to said pad and said protection means, for detecting an abnormal voltage having a second polarity opposite the first polarity and for generating a detection signal when the abnormal voltage having the second polarity is detected; and logic means for generating said reset signal from detection signals of the abnormal voltage detection means of the plurality of interface circuits.

2. An integrated circuit device as claimed in claim 1, wherein said abnormal voltage detection means comprises a bipolar transistor having a base connected to a first power supply system, an emitter coupled to the internal circuit, and a collector connected, via a first resistance element, to a second power supply system carrying a power supply voltage lower than that of the first power supply system.

3. An integrated circuit device as claimed in claim 2, wherein said bipolar transistor is a PNP transistor.

4. An integrated circuit device as claimed in claim 2, wherein said bipolar transistor has a current transfer ratio based on the abnormal voltage to be detected.

5. An integrated circuit device as claimed in claim 1, wherein said abnormal voltage detection means comprises a bipolar transistor having a collector coupled to a first power supply system via a first resistance element, a base connected to a second power supply system carrying a power supply voltage lower than that of the first power supply system and an emitted coupled to the pad via a second resistance element and coupled to the internal circuit.

6. An integrated circuit device as claimed in claim 5, wherein said bipolar transistor is an NPN transistor.

7. An integrated circuit device as claimed in claim 5, wherein said bipolar transistor has a current transfer ratio based on the abnormal voltage to be detected.

8. An integrated circuit device as claimed in claim 1, wherein
said abnormal voltage detection means comprises a parasitic transistor formed by a transistor of said protection means.

9. An integrated circuit device as claimed in claim 1, wherein said logic means comprises:
a signal bus carrying said reset signal, and
a plurality of switching elements connected to the signal bus,
wherein said switching elements respectively control a potential of the signal bus in accordance with said respective, detection signals.

10. An integrated circuit device as claimed in claim 9, wherein said switching elements respectively comprise transistors coupled between first and second power supply systems.

11. An integrated circuit device as claimed in claim 1, further comprising:
at least first and second signal buses; and
a plurality of switching elements respectively connected to the first and second signal buses, each of said plurality of switching elements being further connected to corresponding ones of said plurality of interface circuits, wherein said logic means includes
a logic gate receiving potentials of the signal buses and generating said reset signal therefrom, and
said switching elements respectively control potentials of the signal buses in accordance with said respective, detection signals.

12. An integrated circuit device as claimed in claim 11, wherein the abnormal voltage detection menas of each of a first group of said plurality of interface circuits are connected to said first signal bus through corresponding ones of said plurality of switching elements and each such abnormal voltage detection means comprises a bipolar transistor having a base connected to a first power supply system, an emitter coupled to the internal circuit, and a collector connected, via a first resistance element, to a second power supply system carrying a power supply voltage lower than that of the first power supply system;

the protection means of each of the first group of said plurality of interface circuits comprises an N-channel transistor having a drain coupled to the pad via a second resistance element, a source and a gate, both of which are connected to the second power supply system;

the abnormal voltage detection means of each of a second group of said plurality of interface circuits are connected to said second signal bus through corresponding ones of said plurality of switching elements and each such abnormal voltage detection means comprises a bipolar transistor having a collector coupled to the first power supply system via a first resistance element, a base connected to the second power supply system carrying a power supply voltage lower than that of the first power supply system, and an emitter coupled to the pad via a second resistance element and coupled to the internal circuit; and the protection means of each of the second group of said plurality of interface circuits comprises a N-channel transistor having a drain coupled to the pad via the second resistance element, a source and a gate, both of which are connected to the first power supply system.

13. An integrated circuit device as claimed in claim 1, wherein:
said abnormal voltage detection means comprises a bipolar transistor having a base connected to a first power supply system, an emitter coupled to the internal circuit, and a collector connected, via a first resistance element, to a second power supply system carrying a power supply voltage lower than that of the first power supply system; and
said protection means comprises an N-channel transistor having a drain coupled to the pad via a second resistance element, a source and a gate, both of which are connected to the second power supply system.

14. An integrated circuit device as claimed in claim 1, wherein:
said abnormal voltage detection means comprises a bipolar transistor having a collector coupled to a first power supply system via a first resistance element, a base connected to a second power supply system carrying a power supply voltage lower than that of the first power supply system, and an emitter coupled to the pad via a second resistance element and coupled to the internal circuit; and
said protection means comprises a N-channel transistor having a drain coupled to the pad via the second resistance element, a source and a gate, both of which are connected to the first power supply system.

15. An integrated circuit device as claimed in claim 1, wherein said integrated circuit device is a one-chip microcomputer.

* * * * *